Oct. 2, 1962 L. KÖRMENDY 3,056,299
MINIATURE MERCURY PRESSURE GAUGE, PARTICULARLY FOR
MEASURING THE BLOOD-PRESSURE
Filed March 6, 1959
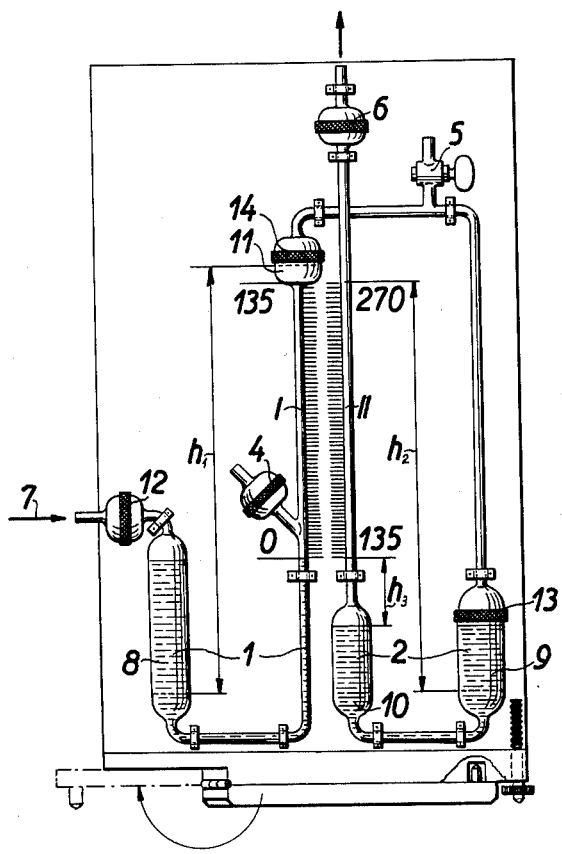
INVENTOR.
LAJOS KÖRMENDY
BY
Irwin S. Thompson
ATTY.

United States Patent Office 3,056,299
Patented Oct. 2, 1962

3,056,299
MINIATURE MERCURY PRESSURE GAUGE, PARTICULARLY FOR MEASURING THE BLOOD-PRESSURE
Lajos Körmendy, 1 Estike U., Budapest XI, Hungary
Filed Mar. 6, 1959, Ser. No. 797,616
Claims priority, application Hungary Mar. 14, 1958
5 Claims. (Cl. 73—402)

This invention relates to miniature mercury pressure gauges, particularly for measuring the blood-pressure.

As is known, mercury gauges are frequently used for measuring pressures less than 1 atmosphere. From a structural point of view, such mercury gauges are similar to the known mercury barometers, however with the difference that, in the nonoperational position of the device, the quiescent mercury surface is exposed to the pressure of the ambient atmosphere. In operation, the mercury surface becomes displaced under the action of the pressure to be measured which is balanced by a hydrostatic pressure corresponding to the displacement of the mercury surface.

Such pressure gauges are very useful for measuring the blood-pressure in medical diagnosis.

The usual mercury pressure gauges show the inconvenience of requiring a mercury column of the height of about 760 millimeters so as to be capable of balancing a pressure of about 1 atmosphere. Obviously, by such a considerable structural height the versatility of the known devices is, especially in case of portable ones, in many cases substantially restricted. Even the measuring range of blood-pressure gauges has to be extended to heights of 270 to 300 millimeters mercury which means at least a like structural height.

Thus, the known mercury pressure gauges, though reliable, are in many cases unsuitable for a number of purposes. Instead, dial blood-pressure gauges and counter-pressure mercury manometers operating with an intermediate medium, e.g. with air, are applied for blood-pressure measuring purposes.

The dial blood-pressure measuring gauges operate on the principle of the usual manometers and have the inconveniences of a restricted measuring accuracy and, due to a considerable number of moving parts, of an extended possibility of breakdowns and measuring errors.

With the counter-pressure mercury manometer the mercury surface rising under the action of the pressure to be measured communicates with a closed gas chamber rather than with the ambient atmosphere. The pressure to be measured is balanced, on the one hand, by the hydrostatic pressure corresponding to the displacement of the rising mercury column and, on the other hand, by the compression pressure of the gas in the closed gas chamber in front of the rising mercury surface. An inconvenience of such systems consists in that the mercury column is liable to displacements also upon altering of the pressure of the ambient atmosphere, that is, the measuring results are considerably dependent upon atmospheric conditions. Furthermore, the displacement of the mercury surface is, within the measuring range of 0 to 300 millimeters mercury, about 90 millimeters whereby the size of the device is substantially reduced. Then, however, the calibration or scale division of the device has to be accommodated within such distance which can be effected obviously at the expense of accuracy of the readings only. The suitable readability is further deteriorated by the alteration of the gas pressure being non-linear so that scale divisions are considerably more dense towards the range of higher pressure values.

The main object of the present invention is to obviate the aforesaid inconveniences by the provision of a suitable mercury pressure gauge, particularly blood-pressure gauge.

A further object of the invention is to make use of the hydrostatic pressure of mercury when measuring the blood-pressure and thereby to warrant a simple principle of operation practically free of sources of measuring errors and breakdowns.

A still further object of the invention is to decrease the dimensions of the new gauge with respect to those of the known devices for which purpose two or several mercury columns are used rather than one as has been the case with the hitherto known devices.

Still another object of the invention is to connect such mercury columns in series or in cascade whereby their hydrostatic pressures are added. E.g., in case of a pair of mercury columns the first thereof may indicate the ascertained value of the pressure to be measured within the pressure range of say 0 to 135 millimeters mercury whereas pressures superior to the said value may be indicated by the second mercury column having a measuring range of 135 to say 270 millimeters mercury, 135 millimeters mercury being the value at which said first mercury column covers its whole measuring range whereas said second mercury column just appears at the beginning of its own scale.

A still further object of the invention consists in selecting said intermediate medium, the mutual dimensions of the mercury columns and their receptacles as well as the level difference between the quiescent mercury surfaces so as to ensure that said mercury columns perform their displacements in the above said manner.

The measuring results obtained by the device according to the invention are not influenced by the atmospheric pressure since at starting of the measuring process all mercury surfaces participating in the same are, by means of suitable pipe fittings, exposed to the pressure of the ambient atmosphere the influence of which being eliminated thereby. The last mercury column in the system is open, that is its surface is constantly exposed to the pressure of the ambient atmosphere.

The readability of the indications is practically doubled or multiplied by the system of two or several mercury columns, respectively, connected in series. Dependent on the nature of the medium intermediate the mercury columns the scale division or calibration of the device is linear as is the case e.g. if liquids are used for such mediums. A non-linear scale division is to be reckoned with if the intermediary medium is some gas such as air although the deviation from linearity is theoretical rather than actual and of so little values that sensing of it is hardly possible. On the other hand, the linear scale division improves the accuracy of the readings.

Further objects and features of the invention will be apparent from the following description by taking reference to the accompanying drawing which shows, by way of example, a preferred embodiment of the miniature mercury pressure gauge according to the invention.

In the drawing, 1 and 2 designate a pair of U-shaped tubes which, in the instant case, are connected in series and comprise each a mercury column. Obviously, instead of a pair of such tubes three or more thereof might as well be connected in series or in cascade without departing thereby from the spirit of the invention. Air serves as an intermediary medium between the mercury columns in the U-shaped tubes 1 and 2.

Prior to measuring, the quiesecent mercury surfaces within the U-tubes 1 and 2 are pairwise balanced and mutually offset by a level difference of $h_3$. Through openings 4 to 6 the pressure of the ambient atmosphere is permitted to act on the quiescent mercury surfaces. Moreover, the openings 4 and 6 are provided with pipe fittings, for instance with sealing means made of buckskin or sponge glass which permit the air to enter and which are impenetrable to mercury. At the beginning of the measuring process the opening 4 is automatically closed by the rising mercury column lest the air which as intermediary medium forwards a portion of the pressure towards U-tube 2 may escape through said opening. The opening 5 may, prior to measuring, be opened if necessary, e.g. for restoring an eventually interrupted mercury column. Thereafter opening 5 has to be closed. Opening 6 forms, as it were, the outlet of the device.

The pressure to be measured is, e.g. by means of air, transmitted at 7 to the inlet of the device, that is to the inlet branch of U-tube 1. Under the action of the introduced pressure the mercury columns in both U-tubes 1 and 2 become unbalanced. In what may be called the outlet branch I of the first U-tube 1 the mercury column rises and thereby pushes the air enclosed between both mercury columns through what may be called the inlet branch of U-tube 2. Thus, also the mercury column in outlet branch II of U-tube 2 is caused to rise and the pressure to be measured is balanced by the sum of the hydrostatic pressures in both U-tubes 1 and 2. Portions 9 and 10 of U-tube 2 are, however, formed as receptacles and their dimensions are selected so that the mercury level in outlet branch II reaches a height of $h_3$, that is it arrives at the beginning of its own scale when the mercury level in outlet branch I has risen to the topmost point of the scale of outlet branch I which is, in the instant case, 0 to 135 millimeters mercury. Hereupon, mainly mercury column in outlet branch II will rise since the cross-sectional area of a receptacle 11 at the upper end of outlet branch I has the multiple value of that of the cross-sectional area of outlet branch II.

Thus, the scale of the device as a whole begins on outlet branch I and is continued on outlet branch II, its upper limit being, in the instant case, 270 millimeters mercury. If this limit is reached by the rising mercury column in outlet branch II, the pressure to be measured is balanced by the sum of the hydrostatic pressures $h_1$ and $h_2$ indicated in the drawing.

In order to prevent the mercury from escaping from the device e.g. during transport, or to penetrate from one chamber into an undesired other chamber, pipe fittings 12, 13 and 14 are provided at the inlet 7, at the top of the receptacle 11 and in the receptacle 9, respectively, these pipe fittings being likewise penetrable to air and impenetrable to mercury.

If, instead of air, a liquid is used as an intermediary medium, besides the hydrostatic pressures dependent on the mutual levels of the mercury columns also the hydrostatic pressure, due to displacements of the levels of such liquids, is to be considered. When using air as an intermediary medium, the effect of its level displacements may be neglected. On the other hand, it is to be considered that when air is used as an intermediary medium, its volume between both mercury columns is liable to alterations dependent on its pressure. Such alterations of the air volume may be considered by suitably sizing the receptacles 8, 9, 10 and 11.

In operation, the device is to be held in vertical position. For this purpose, it is provided with a collapsible support. During transport the support is retracted whereas in operation it is actuated as shown by solid and dotted lines, respectively, in the drawing.

What I claim is:

1. Miniature mercury pressure gauge, more particularly blood-pressure gauge, comprising a system of at least two U-shaped tubes connected in series, mercury columns in each of said U-shaped tubes having balanced levels in a nonoperational position of the gauge, a transmitting medium intermediate said mercury columns and having a specific weight less than that of mercury, said transmitting medium consisting of air, said transmitting medium being acted upon by said mercury columns, inlet means for connecting an inlet branch of one of said U-shaped tubes to a pressure to be measured, the outlet branch of said U-shaped tube being connected to an inlet branch of the other one of said U-shaped tubes, outlet means for connecting an outlet branch of said other U-shaped tube to atmospheric pressure, means penetrable to gases but not mercury disposed in the output of the first U-shaped tube immediately above the nonoperational level of the mercury whereby said means is sealed to gases when the mercury is displaced over it, and scale means along the outlet branches of said U-shaped tubes for indicating displacements of said mercury columns therein.

2. Miniature mercury pressure gauge according to claim 1 comprising further means penetrable to gases but not mercury before and behind each of said U-shaped tubes.

3. Miniature mercury pressure gauge according to claim 1 comprising at least one closable passage opening into an ambient atmosphere between said inlet means and said outlet means.

4. Miniature mercury pressure gauge according to claim 2 in which said means penetrable to gases but not mercury is composed of porous material such as leather and sponge glass.

5. Miniature mercury pressure gauge according to claim 1 comprising a collapsible support adapted for holding the pressure gauge in a vertical position for operation and for being retracted in a nonoperational position thereof.

References Cited in the file of this patent

UNITED STATES PATENTS

| | | |
|---|---|---|
| 2,228,023 | Abbert | Jan. 7, 1941 |
| 2,562,494 | Hejduk | July 31, 1951 |
| 2,836,067 | Quist | May 27, 1958 |

FOREIGN PATENTS

| | | |
|---|---|---|
| 25,517 | Great Britain | Nov. 13, 1896 |